United States Patent [19]

Friedli et al.

[11] Patent Number: 4,488,220
[45] Date of Patent: Dec. 11, 1984

[54] CIRCUIT ARRANGEMENT FOR INPUTTING CONTROL SIGNALS INTO A MICROCOMPUTER SYSTEM

[75] Inventors: Paul Friedli, Zürich; Fritz Meyer, Küssnacht, both of Switzerland

[73] Assignee: Inventio AG, Hergiswil, Switzerland

[21] Appl. No.: 359,829

[22] Filed: Mar. 19, 1982

[30] Foreign Application Priority Data

Mar. 26, 1981 [CH] Switzerland ............ 2037/81

[51] Int. Cl.³ ............................................. G06F 15/16
[52] U.S. Cl. .................................................. 364/200
[58] Field of Search ................ 364/200 MS File, 300, 364/900 MS File

[56] References Cited

U.S. PATENT DOCUMENTS

| | | | |
|---|---|---|---|
| 3,593,302 | 7/1971 | Saito et al. | 364/200 |
| 4,075,691 | 2/1978 | Davis et al. | 364/200 |
| 4,219,881 | 8/1980 | Wilske | |
| 4,234,919 | 11/1980 | Bruce et al. | 364/200 |
| 4,271,466 | 6/1981 | Yamamoto et al. | 364/200 |
| 4,272,819 | 6/1981 | Katsumata et al. | 364/200 |
| 4,292,669 | 9/1981 | Wollum et al. | 364/200 |
| 4,293,908 | 10/1981 | Bradley et al. | 364/200 |
| 4,325,119 | 4/1982 | Grandmaison et al. | 364/200 |

OTHER PUBLICATIONS

"Intelligent Multiplexer Increases Processor Efficiency", by Edward Harriman, Electronics, May 26, 1977.

"Making Mini I/O Upward-Compatible", by Jerry Washburn, Electronics, Mar. 17, 1977.

Primary Examiner—Gareth D. Shaw
Assistant Examiner—Jameson Lee
Attorney, Agent, or Firm—Werner W. Kleeman

[57] ABSTRACT

With this circuit arrangement a plurality of control commands can be inputted into a microcomputer system by means of only a single input channel and the microprocessor is relieved of the operation of scanning the peripherals for detecting the presence of control commands. By means of a release or enabling signal the microprocessor signals its preparedness for receiving interruptions, and the release or enabling signal activates a scanning and comparator unit arranged between an interrupt requirement input of the microprocessor and a peripheral unit. Thereafter the scanning and comparator unit scans control command transmitters grouped together in the peripheral unit and characterized by an address and compares the switching state thereof with a switching state which is stored under the same address. If the two switching states are different, there is generated an interrupt requirement or requisition and the stored switching state is adapted to the switching state of the control command transmitter.

3 Claims, 2 Drawing Figures

CIRCUIT ARRANGEMENT FOR INPUTTING CONTROL SIGNALS INTO A MICROCOMPUTER SYSTEM

BACKGROUND OF THE INVENTION

The present invention relates to a new and improved circuit arrangement for inputting control commands into a microcomputer system, wherein a microprocessor is connected to at least one read-write memory (RAM) and a read-only memory (ROM) by means of an address bus, data bus and control bus, and to a parallel input-output interface component or block by means of the address bus, an input-output bus and further lines. By means of at least one interrupt requirement input the input-output interface is connected to at least one peripheral unit.

A number of different methods have been developed for data transfer between a microcomputer system and the peripherals. Thus, for instance, with the programmed input and output of data the data transfer is controlled by a program which must be carried out by the microprocessor of the microcomputer system. Such arrangement is afflicted with the disadvantage that with an increasing number of peripheral units or peripherals there also increases the expenditure in software, and the processor, depending upon the mode of employment thereof, must scan the peripherals relatively frequently for detecting the presence of data or control commands. Thus, time is lost for performing other tasks.

With another prior art method, the so-called interrupt input, these disadvantages are partially avoided. In this case, it is common practice that, with the presence of data or control commands which are to be received an interrupt requirement or demand is transmitted to the microprocessor of the system. After accepting this interrupt requirement the microprocessor thereafter interrupts the then presently running program, intermediately stores or buffers the register contents, and by means of an interrupt program receives and processes the new data transmitted by the peripheral units or peripherals. Upon completion of the interrupt program the microprocessor continues with the main program. If there are present a number of peripheral units and there are simultaneously requested a number of interruptions, then the sequence of the data input and the processing of the data is determined by means of a priority logic.

With state-of-the-art microcomputer systems there are used interruption priority components or blocks which are simultaneously suitable for the parallel input and output of data. A component of this commercially available type, for instance TMS9901 manufactured by Texas Instruments Corp. (User's Manual TM990/100M, December 1977), possesses at its interface to the peripheral sixteen interrupt inputs and further inputs-outputs for parallely appearing data. At the interface to the microprocessor this component is provided with an interrupt output and four related address outputs and also further inputs and outputs which are required for the communication or data traffic with the microprocessor. Upon the occurrence of interrupt requirements or requests an internal priority logic determines the priority for the interrupt signals and forms the address belonging to the highest priority and also the interrupt for the microprocessor.

A disadvantage associated with the method of inputting interruptions resides in the fact that the microprocessor is forced to interrupt a running operation and to postpone the same.

With the employment of components of the type described above a running interrupt program itself can be interrupted by one or more newly occurring interrupts having a higher priority. The interleaving of interrupt programs resulting as a consequence thereof requires additional microprocessor time. A further disadvantage is manifested in the fact that there are present a relatively limited number of interrupt inputs, so that in the case of a multiplicity of control commands which are to be inputted there has to be performed an interrupt augmentation or enlargement by cascading two components or blocks. However, this requires an additional expenditure in software and, consequently, a corresponding greater amount of processor time.

SUMMARY OF THE INVENTION

Therefore, it is a primary object of the present invention to provide a new and improved circuit arrangement which is not associated with the aforementioned drawbacks and limitations of the prior art arrangements.

Another important object of the present invention aims at providing a new and improved circuit arrangement which, with a plurality of control commands to be inputted, only requires a minimal number of input channels, and by means of which the time needed by the microprocessor during the input operation can be reduced.

Still a further important object of the present invention is to provide a new and improved circuit arrangement of the character described which is extremely reliable and effective in its operation.

Now in order to implement these and still further objects of the invention, which will become more readily apparent as the description proceeds, the present development contemplates partially adapting the two aforementioned state-of-the-art methods in that, the microprocessor by means of a release or enabling signal indicates its preparedness to accept interruptions. The release signal activates a scanning and comparator unit arranged between an interrupt requirement input of the parallel input-output interface component or block and the peripheral unit. This scanning and comparator unit thereafter scans control command transmitters grouped together in the peripheral unit and characterized by an address and compares the switching state thereof with a switching state which is stored under the same address. If the two switching states differ from each other, there is generated an interrupt requirement or demand and the stored switching state is adapted or matched to the switching state of the control command transmitter.

The advantages afforded by the present invention are essentially manifested in that, on the one hand, the microprocessor is relieved of the operation of scanning the peripherals and, on the other hand, there only is required one interrupt requirement input and no data input for a plurality of control commands which are to be inputted. Thus, the remaining inputs of the parallel interface component or block located at the interface or intersection to the peripherals are available for other tasks. Since the control command transmitters grouped together in the peripheral unit are sequentially scanned, an interrupt program, once it is running, cannot be interrupted by a newly incoming control command, which saves processor time. A further advantage of the present invention resides in the fact that the control transmitters are grouped together so that they form a matrix-type scanning or sampling field, which allows for economy in wiring and control elements as essentially is known to the art.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
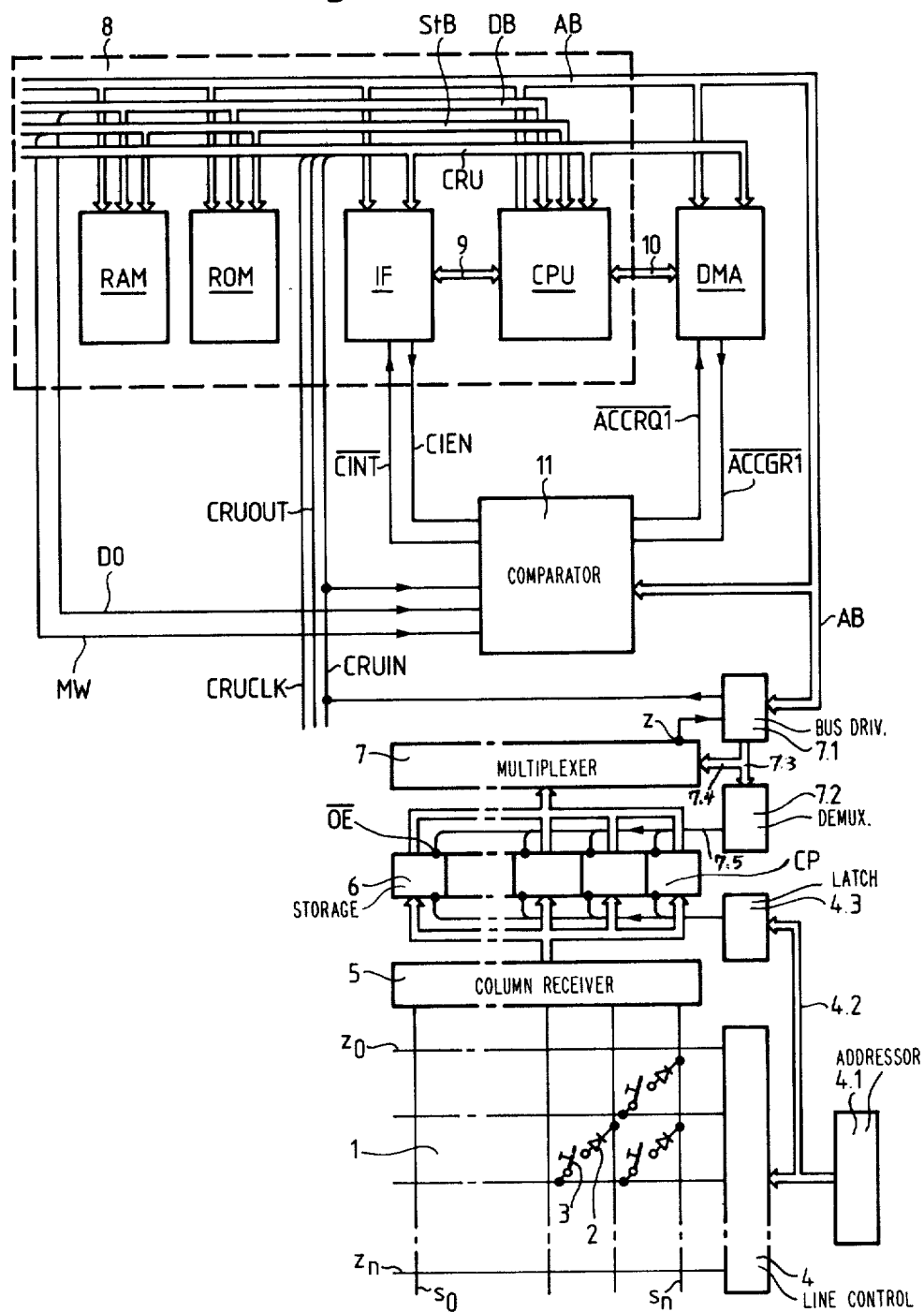
FIG. 1 is a block circuit diagram of a circuit arrangement according to the invention.

Describing now the drawings, there is illustrated in FIG. 1 a matrix-type scanning or sampling field which is generally designated by reference numeral 1. The row and column lines or conductors of this scanning field 1 can be connected at the intersection or cross-over points to a control command transmitter 3 which is connected in series with a diode 2 and which is conventionally responsive to any suitable external command signal. The row conductors $Z_0$-$Z_n$ are connected to the outputs of a row or line control 4 composed of a demultiplexer, optocouplers and amplifiers. An addressing or address device 4.1 addressing the row conductors $Z_0$-$Z_n$ and composed of a counter and clock generator is connected by means of the address line or conductor 4.2 with the row control 4 and an addressable latch 4.3. The column conductors $S_0$-$S_n$ are connected to the not particularly referenced inputs of a column receiver 5 composed of optocouplers, pulse shapers or formers and a driver. The outputs of the column receiver 5, which are operatively associated with the respective column conductors or lines, are connected to the inputs of multiple storages 6, and each line or row conductor is operatively associated with a multiple storage 6 and the number of storage cells of a multiple storage 6 is equal to the number of column conductors. Thus, there are provided, for instance, with a matrix having eight row and eight column conductors a total of sixty-four individual storage cells, which are divided-up into eight multiple or multi-storages 6 in the form of octal flip-flops. The clock connections or clock input connections CP of the multiple storages 6 are connected with the outputs of the addressable latch 4.3. When addressing, for instance, the row or line conductor $Z_0$ there are simultaneously activated, by means of the addressable latch 4.3, the clock connections CP of the octal flip-flop 6 which is operatively associated with the row conductor $Z_0$, so that the switching states of the control command transmitters 3 which are connected to the row conductor $Z_0$ and the column conductors $S_0$-$S_n$ are transmitted by means of the column receiver 5 and the inputs of the corresponding octal flip-flop 6 to the outputs of the octal flip-flop 6.

Reference numeral 7 designates a multiplexer, the data inputs of which are connected to the outputs of the multiple storages 6. At its input side a bus driver 7.1 is connected to an address bus AB of a microcomputer system 8 and at its output side is connected by means of a first part 7.3 of the address conductor or line to the address inputs of a demultiplexer 7.2 and by means of a second part 7.4 of the address conductor to the address inputs of the multiplexer 7. The outputs 7.5 of the demultiplexer 7.2 are connected with the release or output enabling connections $\overline{OE}$ of the outputs of the multiple storages 6. By means of the bus driver 7.1 the output Z of the multiplexer 7 is connected to a data input line or conductor CRUIN which is operatively associated with a serial input-output bus CRU, and also a data output line or conductor CRUOUT and a clock signal line or conductor CRUCLK are connected with this serial input-output bus CRU.

A microprocessor CPU of the microcomputer system 8 is connected by the address bus AB, a data bus DB and a control bus StB to at least one read-write memory (RAM) and one read-only memory (ROM), and also by means of the address bus AB, the input-output bus CRU and further lines 9 and 10, respectively, to a parallel input-output interface component or block IF and a DMA-component DMA, meaning a direct memory access component or block. In each case one bit of a number of data words stored in the read-write memory RAM is associated with the switching state of a given control command transmitter 3. By means of an interrupt requirement or demand input $\overline{CINT}$ and an output $\overline{CIEN}$ delivering a release or enabling signal for a DMA-operation the parallel input-output interface component or block IF is connected to a comparator unit or comparator 11, which will be more fully discussed hereinafter when describing the illustration of FIG. 2. The DMA-component DMA is connected to the comparator unit 11 by means of an input $\overline{ACCRQ1}$ which reads a DMA requirement or demand signal, and an output $\overline{ACCGR1}$ which delivers a receipt signal.

Figure 2:
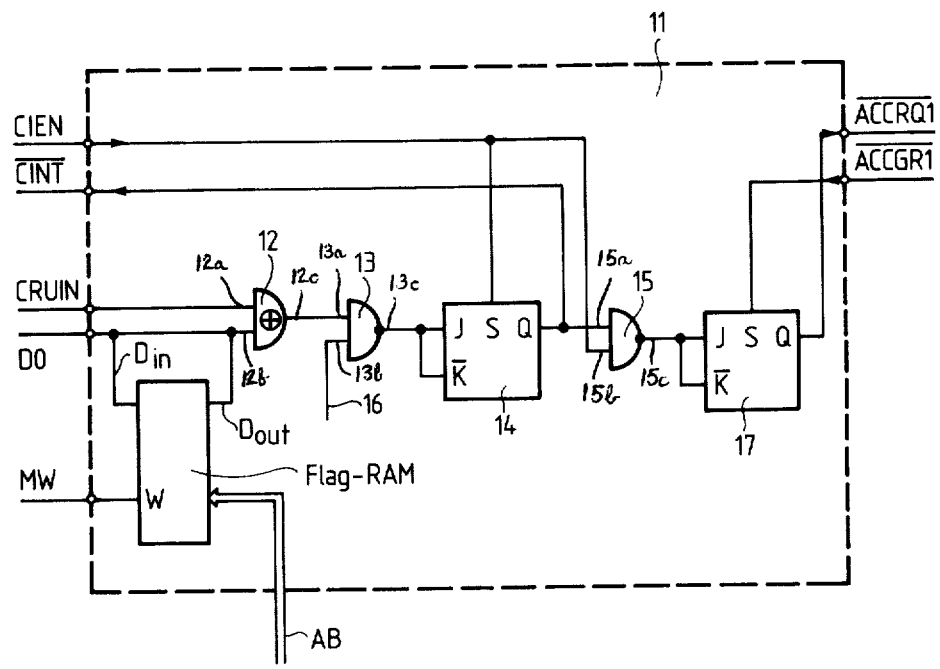
FIG. 2 illustrates a comparator unit or comparator of the circuit arrangement according to FIG. 1.

In FIG. 2 there is designated by reference numeral 12 an Exclusive-OR gate which has its one input 12a connected to the data input line or conductor CRUIN and its other input 12b connected to the data output $D_{out}$ of a further read-write memory Flag-RAM. The read-write memory Flag-RAM is connected with the address bus AB and by means of a data input $D_{in}$ is connected to a data line or conductor DO of the data bus DB and by means of a write connection W is connected to a line or conductor MW of the control bus StB. In this further read-write memory Flag-RAM there are stored the switching states of the control command transmitters 3 in the form of 1-bit words. By means of a first NAND-gate 13 the output 12c of the Exclusive-OR gate 12, which is connected with the first input 13a of the NAND-gate 13, is connected to the inputs J and $\overline{K}$ of a first J$\overline{K}$-flip-flop 14, the output Q of which is connected to the interrupt requirement or demand input $\overline{CINT}$ of the parallel interface component or block IF and to the input 15a of a second NAND-gate 15. By means of the line or conductor 16 the DMA-component DMA, if used for other purposes, can deliver a disabling or inhibit signal to a further or second input 13b of the first NAND-gate 13. The set terminal or connection S of the first J$\overline{K}$-flip-flop 14 is connected with a further or second input 15b of the second NAND-gate 15 and with the output CIEN of the parallel interface component or block IF which delivers the release or enabling signal. The output 15c of the second NAND-gate 15 is connected with the inputs J$\overline{K}$ of a second J$\overline{K}$flip-flop 17, the output Q of which is connected to the input $\overline{ACCRQ1}$ of the DMA-component DMA, which input $\overline{ACCRQ1}$ reads the DMA-requirement signal. The set connection S of the second $\overline{K}$-flip-flop 17 is connected with the output $\overline{ACCGR1}$ of the DMA-component DMA, and this output $\overline{ACCGR1}$ delivers a receipt signal.

The connections or terminals and the connection lines required for transmitting the clock signal to the JK-flip-flops have not been particularly illustrated in the drawings in order to simplify the showing thereof. The here described digital logic elements and components or blocks are commercially available components. For instance, there can be used for the microprocessor CPU, the parallel interface component IF and the DMA-component DMA such respective commercially available components of the type TMS9900, TMS9901 and TMS9911, manufactured by Texas Instruments Corp. In the drawings, the signals appearing at the various inputs and outputs of the components have been designated by the same reference characters as the corresponding inputs and outputs.

Hereinafter there will be described the mode of operation of the circuit arrangement described above, which may be used, for instance, for inputting floor or storey calls at microcomputer-controlled elevators.

With the generation of a release signal the microcomputer system 8 indicates its preparedness for receiving peripheral-control commands. The potential at the output CIEN of the parallel interface component IF is set high. The interrupt requirement or demand input $\overline{\text{CINT}}$ of the same component may possess a high potential, for instance if no interrupt requirement signal is present. At the output 15c of the second NAND-gate 15 and with the clock signal change also at the output Q of the second JK-flip-flop 17 of the comparator unit 11 there occurs, in this case, a change in potential, which at the input $\overline{\text{ACCRQ1}}$ of the DMA-component DMA is interpreted as a DMA requirement signal. Thereafter, the DMA-component DMA delivers by means of its output $\overline{\text{ACCGR1}}$ a receipt signal to the set connection or terminal S of the second JK-flip-flop 17 and signals to the microprocessor CPU its desire to assume control over the address bus AB and the data bus DB. After a given latency time such control is granted, whereupon the DMA-component DMA places an address from its address register onto the address bus AB. Consequently, the peripheral units or peripherals 1 to 7 and the write-read memory Flag-RAM of the comparator unit or comparator 11 feel that they have been addressed. By means of the demultiplexer 7.2 a first part of the address not identifies an octal flip-flop 6 which is associated with a predetermined row conductor, in that the outputs of the octal flip-flop 6 are activated via the corresponding release or enabling terminal or connection $\overline{\text{OE}}$. By means of the address inputs of the multiplexer 7 a second part of the address identifies an individual storage cell of the octal flip-flop 6, and which storage cell is associated with a predetermined column conductor. As a consequence, the initial state of the identified storage cell, which initial state appears at the output Z of the multiplexer 7 and corresponds to a predetermined control command transmitter 3, is transferred via the data input conductor or line CRUIN to the one input 12a of the Exclusive-OR gate 12 of the comparator unit or comparator 11. By means of its output $D_{out}$ the read-write storage Flag-RAM simultaneously delivers the content of the storage location, which has been addressed by means of the first and second part of the address, to the other input 12b of the Exclusive-OR gate 12.

Let it be assumed that the stored 1-bit word has the logic state or value "0", which corresponds to a switching state "OFF", whereas the scanned peripheral bit has the logic state or value "1" which corresponds to a switching state "ON" of the related control command transmitter 3. The output of the Exclusive-OR gate 12 is set high and with the clock signal change the output Q of the first JK-flip-flop 14 is set low. At the input $\overline{\text{CINT}}$ of the parallel interface component IF this signal change is interpreted as an interrupt requirement or demand. With the presence of the interrupt requirement or demand signal there cannot be generated a further DMA requirement signal, since the input 15a of the second NAND-gate 15, which input is connected to the output Q of the first JK-flip-flop 14, equally has a low potential.

After accepting the interrupt requirement or demand the microprocessor CPU reads the address of the DMA address register, at which address there was detected an inequality or deviation. The microprocessor CPU equally reads the scanned peripheral bit on the data input line CRUIN and writes it via the data line DO into the read-write memory Flag-RAM of the comparator 11. Upon completion of the interrupt program the microprocessor CPU sets the output CIEN of the parallel interface component IF to low potential. Thus, the release or enabling signal disappears and by means of the set connection or terminal S of the first JK-flip-flop 14 the output Q thereof is set high and, consequently, the interrupt requirement signal is extinguished.

If, at that moment, the microcomputer system 8 does not have to perform any other tasks, it can once again transmit the release or enabling signal, so that there transpire the same operations as described above. If there is not detected any inequality or deviation during the comparison operation, then there equally is not generated an interrupt requirement or demand. In this case, there are continuously formed DMA requirements while the release or enabling signal is maintained. This is accomplished in that upon acknowledgement or receipting of the DMA requirement the output Q of the second JK-flip-flop 17, during the clock signal change, again is set to low potential by means of the output $\overline{\text{ACCGR1}}$ of the DMA-component DMA. When arriving at the end address of the DMA address register there is generated a DMA interrupt requirement or demand, so that the micrprocessor CPU is caused to newly load the register of the DMA-component.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A microcomputer system comprising:
   a microcomputer containing:
   at least one random-access memory storing data bits in related, addressable storage locations;
   a read-only memory;
   a microprocessor;
   an address bus, a data bus including at least one data line, and a control bus including at least one control line;
   each said address bus, said data bus and said control bus operatively interconnecting said microprocessor, said at least one random-access memory and said read-only memory;
   a parallel input-output interface component;
   conductor means and an input-output bus including a data input line, a data output line and a clock signal line;

said address bus, said input-output bus and said conductor means operatively interconnecting said microprocessor and said parallel input-output interface component;

a circuit arrangement for inputting control commands into said microcomputer and comprising:
conductor means;
a DMA component including an address register;
said DMA component being connected by said address bus to the microprocessor, the parallel input-output interface component, the read-only memory, and the at least one random-access memory:
  said DMA component being further connected by said input-output bus to said microprocessor and said parallel input-output interface component, and by said conductor means of said circuit arrangement to said microprocessor;
  said input-output interface component having an interrupt request input and a DMA operation release output;
  said DMA component having a DMA request input and a DMA receipt output;
  a comparator connected to said input-output interface component via said interrupt request input and said DMA operation release output thereof and to said DMA component via said DMA request input and said DMA receipt output thereof;
  said microcomputer generating a DMA operation release signal which is transmitted to said comparator via said DMA operation release output of said input-output interface component and by said comparator to said DMA request input of said DMA component in order to initiate a DMA operation;
  a peripheral unit connected to said data input line of said input-output bus;
  said peripheral unit comprising a group of control command transmitters and a group of addressable storage cells;
  each one of said control command transmitters being operatively associated with a related one of said addressable storage cells;
  each said control command transmitter generating an initial control command which is stored in a related one of the addressable storage locations of said random-access memory of the microcomputer and in said related addressable storage cell as an initial data bit;
  each said control command transmitter, in response to an externally applied command signal, generating an instantaneous control command which is transmitted to said related addressable storage cell, replaces said initial data bit stored therein and, in turn, is stored therein as an instantaneous data bit;
  said comparator having a first input connected to the data input line of said input-output bus and having a second input;
  said comparator containing a read-write memory connected to said address bus and to said at least one control line of said control bus;
  said read-write memory contained in said comparator comprising a predetermined number of addressable storage locations;
  said read-write memory having a data input connected to said at least one data line of said data bus in order to store said initial data bit in a related one of said addressable storage locations;
  said read-write memory further having a data output connected to said second input of said comparator;
  said address register of said DMA component sequentially placing on said address bus a plurality of addresses, each of which addresses serves to address the related one of said addressable storage cells, the related one of said addressable storage locations in said read-write memory contained in said comparator and the related one of said addressable storage locations in said at least one random-access memory of said microcomputer;
  said comparator, during said DMA operation, receiving at said first input thereof via said data input line of said input-output bus the instantaneous data bit stored in the addressed storage cell and receiving at said second input thereof from said data output of said read-write memory said initial data bit stored at the addressed storage location thereof and comparing said instantaneous data bit and said initial data bit;
  said comparator, in the case of equality of the instantaneous data bit and the initial data bit, continuing to transmit said DMA operation release signal to said DMA request input of said DMA component and to compare the instantaneous data bit and the initial data bit associated with a further address of said plurality of addresses by which there is addressed a further one of the related addressable storage cells, a further one of the related storge locations in said read-write memory and a further one of the related storage locations in said at least one random-access memory; and
  said comparator, in the case of inequality of the instantaneous data bit and the initial data bit, generating and transmitting an interrupt request signal to said microprocessor via said interrupt request input of said input-output interface component and blocking said sequentially placing of a further address on said address bus, whereby said microprocessor, during an interrupt operation thereof, reads said instantaneous data bit, which is associated with the addressed storage cell and which is present on said data input line of said input-output bus, and writes said instantaneous data bit into the addressed storage location of said random-access memory of said microcomputer and into the addressed storage location of said read-write memory contained in said comparator via the at least one data line of said data bus, and the microprocessor, after completion of the interrupt operation, terminates said DMA operation release signal and thereby said DMA operation.

2. The microcomputer system as defined in claim 1, wherein:
said group of control command transmitters in said peripheral unit comprises a matrix-like field composed of predetermined numbers of intersecting row lines and column lines defining a predetermined number of intersection points;

each one of said control command transmitters being arranged at a related one of said intersection points;

an addressing device;

row control means operatively connected to said row lines and to said addressing device;

said group of addressable storage cells in said peripheral unit comprising a predetermined number of multiple storage devices each of which is associated with a related one of said row lines;

an addressable latch having a predetermined number of outputs each of which is operatively connected to a related one of said multiple storage devices;

said addressing device being operatively connected to said row control means and to said addressable latch in order to address each one of said row lines and the related one of said multiple storage devices;

a column receiver connected to said column lines and having a predetermined number of outputs each of which is operatively associated with a related one of said column lines;

each said multiple storage device containing a predetermined number of said storage cells each of which is associated with a related one of said outputs of said column receiver;

each said storage cell having an input connected to said related output of said column receiver, a clock input connection connected to a related one of said outputs of said addressable latch, an output and an output enabling connection;

a multiplexer having a plurality of inputs each of which is operatively connected to said output of a related one of said storage cells;

said multiplexer further having a plurality of address inputs and an output;

each said address input being associated with a related one of said plurality of inputs and thus with a related one of said storage cells in said multiple storage devices;

a bus driver having an input side connected to said address bus and an output side connected to said plurality of address inputs of said multiplexer;

said bus driver having input connected to said output of said multiplexer and having an output connected to said data input line of said input-output bus;

a demultiplexer having an address input side connected to said output side of said bus driver and a plurality of outputs each of which is connected to said output enabling connection of a related one of said storage cells;

said addressing device, in an addressing operation via said row control means and said addressable latch, sequentially addressing said control command transmitters and the related storage cells at said input thereof and transmitting to and storing in said storage cells the related instantaneous data bit representing the instantaneous control command generated at the addressed control command transmitters;

said DMA component, during said DMA operation and via said address bus, said bus driver and said demultiplexer, addressing a selected one of said storage cells at the output enabling connection thereof in order to thereby transfer said instantaneous data bit stored in the addressed storage cell to the related one of said plurality of inputs of said multiplexer; and said DMA component, during said DMA operation and via said bus driver and said multiplexer, further addressing a selected one of said plurality of address inputs of said multiplexer, which address input is associated with said related input of said multiplexer which, in turn, is associated with the addressed storage cell, and placing said instantaneous data bit from the addressed input of said multiplexer via said output thereof on said data input line of said input-output bus.

3. The microcomputer system as defined in claim 2, wherein:

said comparator contains an Exclusive-OR-gate;

said Exclusive-OR-gate having a first input constituting said first input of said comparator, a second input constituting said second input of said comparator and an output;

a first NAND-gate having a first input connected to said output of said Exclusive-OR-gate, a second input connected to said DMA component and an output;

a first JK̄-flip-flop having inputs, an output connected to said interrupt request input of said input-output interface component and a set connection;

said inputs of said first JK̄-flip-flop being connected to said output of said first NAND-gate;

said Exclusive-OR-gate and said first NAND-gate, during said DMA operation and in said case of inequality of the instantaneous data bit fed from said data input line to said first input of said Exclusive-OR-gate and the initial data bit fed from said addressed storage location of said read-write memory to said second input of said Exclusive-OR-gate, producing a signal change at said output of said first JK̄-flip-flop and thereby generating an output signal which constitutes said interrupt request signal which is transmitted to said interrupt request input of said parallel input-output interface component in order to initiate said interrupt operation of said microprocessor;

a second NAND-gate having a first input, a second input, and an output;

said output of said first JK̄-flip-flop being further connected to said first input of said second NAND-gate;

said second input of said second NAND-gate being connected to said DMA operation release output of said interface component which is also connected to said set connection of said first JK̄-flip-flop;

a second JK̄-flip-flop having inputs, an output and a set connection;

said inputs of said second JK̄-flip-flop being connected to the output of the second NAND-gate;

the output of said second JK̄-flip-flop being connected to said DMA request input of said DMA component;

the set connection of said second JK̄-flip-flop being connected to said DMA receipt output of said DMA-component;

said second NAND gate, in the presence at said second input thereof of said DMA operation release signal from said DMA operation release output of said parallel input-output interface component and in the absence at the first input thereof of said interrupt request signal producing a signal change at said output of said second JK̄-flip-flop and thereby generating an output signal, which is transmitted to said DMA request input of said DMA component and which initiates said DMA operation, and setting said set connection of said second JK̄-flip-flop during said DMA operation;

said once initiated DMA operation being continued by placing a further one of said plurality of addresses on said address bus in said case of equality of said instantaneous data bit and said initial data bit; in which and said second NAND gate, after termination of said interrupt operation by said microprocessor which results in discontinuation of the DMA operation release signal and in setting of said set connection of said first JK̄-flip-flop, and in the absence of said interrupt request signal at said first input of said second NAND gate, producing a signal change at the output of said second JK̄-flip-flop and thereby generating an output signal, which is transmitted to the DMA request input of said DMA component and terminates the DMA operation, and the setting of said second JK̄-flip-flop via said DMA receipt output of said DMA component.

* * * * *

UNITED STATES PATENT AND TRADEMARK OFFICE
CERTIFICATE OF CORRECTION

PATENT NO. : 4,488,220

DATED : December 11, 1984

INVENTOR(S) : PAUL FRIEDLI et al

It is certified that error appears in the above-identified patent and that said Letters Patent is hereby corrected as shown below:

Column 4, line 63, please delete "ACCRQ1" and insert --$\overline{\text{ACCRQ1}}$--

Column 4, line 64, please delete "ACCRQ1" and insert --$\overline{\text{ACCRQ1}}$--

Column 4, line 66, please delete "ACCGR1" and insert --$\overline{\text{ACCGR1}}$--

Column 4, line 67, please delete "ACCGR1" and insert --$\overline{\text{ACCGR1}}$--

Column 5, line 45, please delete "not" and insert --now--

Signed and Sealed this

Twenty-seventh Day of August 1985

[SEAL]

Attest:

DONALD J. QUIGG

Attesting Officer     Acting Commissioner of Patents and Trademarks